United States Patent [19]

Arbib et al.

[11] 4,243,440

[45] Jan. 6, 1981

[54] COATED SOFT SOLDER BAR OR INGOT

[75] Inventors: Gordon F. Arbib, Hemel Hempstead, England; Mervin Baranick, Long Island City, N.Y.

[73] Assignee: Multicore Solders Limited, Hemel Hempstead, England

[21] Appl. No.: 41,423

[22] Filed: May 22, 1979

[30] Foreign Application Priority Data

May 23, 1978 [GB] United Kingdom ............... 21635/78

[51] Int. Cl.³ ............................................. B23K 35/34
[52] U.S. Cl. ......................................... 148/23; 148/25
[58] Field of Search ..................................... 148/22–26

[56] References Cited

U.S. PATENT DOCUMENTS

| | | | |
|---|---|---|---|
| 3,645,782 | 2/1972 | Johnson | 148/26 |
| 4,092,182 | 5/1978 | Arbib | 148/24 |

*Primary Examiner*—P. D. Rosenberg
*Attorney, Agent, or Firm*—Finnegan, Henderson, Farabow, Garrett & Dunner

[57] ABSTRACT

Soft solder in the form of an extruded or cast bar or ingot is provided with a coating which prevents formation of surface oxide during storage of the bar or ingot and which acts as an anti-oxidant surface layer when the bar or ingot is used to form a molten solder bath. The coating may also act as a solder flux so that when a solder bath is formed from the soft solder bar or ingot, the anti-oxidant surface layer formed from the coating also acts as a flux composition hence obviating the necessity of employing a separate solder flux in a soldering operation in which the molten solder bath is used. The coating is formed from a coating material essentially comprising a mixture of a neutral ester of a polyhydric alcohol and an ester derivative of rosin or of a modified rosin.

9 Claims, No Drawings

COATED SOFT SOLDER BAR OR INGOT

This invention relates to soft soldering and is concerned with solder baths such as those used in the electronics industry.

Soldering with a soft solder, i.e. a tin/lead based alloy melting at below about 400° C., is widely employed in the electronics industry, for example in the production of printed circuit assemblies. For the mass-production of such assemblies, the soldering operation can involve the use of a static or moving solder bath on to the surface of which the fluxed printed circuit assembly can be placed. In an automatic mass-soldering machine, the solder from the solder bath can be applied to the surface of the printed circuit assembly by so-called wave soldering, i.e. by forming a standing wave of molten soft solder against the crest of which the printed circuit assembly is caused to travel.

Such solder baths are normally prepared and maintained from soft solder in the form of an extruded or cast bar or ingot, generally of a 60/40 or 63/37 tin/lead solder alloy. It is essential for the solder bar or ingot to be of high purity solder alloy to ensure efficient operation of the solder bath. Likewise it is essential to maintain the molten bath as pure as possible, to avoid the formation of dross on the surface of the molten solder bath and to maintain the free-flowing property of the bath. A difficulty which arises in meeting these purity requirements stems from the tendency of both the solid and molten solder alloy to oxidise in air, with the result that a layer of oxide is formed on the surface of the solid or molten solder alloy. This oxide layer acts as an impurity in the molten solder bath and adds to the formation of dross at the surface of the molten bath. To avoid the foregoing difficulty and hence maintain the high purity of the molten solder bath, it is normally necessary both to package the solder bar or ingot in a plastics film to help prevent the formation of surface oxide or other contamination during storage and also to maintain a surface layer of anti-oxidant material on the molten solder bath to help prevent the formation of oxide impurity on the surface of the molten solder bath.

We have now found in accordance with the invention that it is possible to coat soft solder bars or ingots with a material which will prevent surface oxidation of the bar or ingot during storage and which, when the coated bar or ingot is melted into a solder bath, will form an antioxidant surface layer on the surface of the solder bath. In this manner, it is possible not only to avoid the trouble and expense of both packaging the solder bar or ingot in protective plastics film and applying a separate anti-oxidant material to the surface of the molten solder bath, but also to save time and electrical energy in the melting of the bar or ingot into a solder bath, since the absence of surface oxide will ensure more rapid heat transfer and hence more rapid melting of the solder alloy. In a preferred embodiment of the invention, the coating material will also act as a solder flux, since this may assist the soldering operation and may make it possible to dispense with a separate application of flux to a printed circuit assembly prior to the soldering operation.

The coating material used to coat a soft solder bar or ingot in accordance with the present invention should be solid at ambient temperatures but have a melting point such that it will become liquid at normal solder bath temperatures, generally above 200° C. Coating materials melting in the range from 70° to 120° C. are preferred.

Thus in accordance with the invention there is provided a soft solder alloy in the form of an extruded or cast bar or ingot substantially completely coated with a coating material essentially comprising:

(I) a neutral ester of a polyhydric alcohol, said ester having a molecular weight of at least 300, preferably a neutral ester derived from a polyhydric alcohol and at least one saturated or unsaturated fatty acid or monocarboxylic aromatic acid, the ester advantageously having a molecular weight in the range from 300 to 3000. Particularly suitable esters are those derived from polyhydric alcohols containing from 2 to 8, preferably 3 to 6, hydroxyl groups such as, for example, esters derived from pentaerythritol, e.g. pentaerythritol tetrabenzoate; and (II) an ester derivative of rosin (principally abietic acid), or of a modified rosin, for example a rosin which has been hydrogenated or reacted with a Diels-Alder type reactant such as maleic anhydride. Particularly suitable esters are those derived from rosin or modified rosin and a polyhydric alcohol, preferably pentaerythritol or glycerol.

If desired, a mixture of different esters selected from one or both of the foregoing classes I and II may be employed.

When the coating material is required to act as a solder flux, in addition to acting as an anti-oxidant surface layer for a molten solder bath formed from the coated bar or ingot, there should also be incorporated in the coating material a surface wetting agent which enables the ester mixture to act as a flux as well as an anti-oxidant. The wetting agent may be an aliphatic or aromatic mono- or polycarboxylic acid, for example stearic acid, adipic acid, sebacic acid, or linoleic acid. Suitable acids include the commercially available long chain aliphatic dicarboxylic acids marketed by Unilever-Emery N.V. as EMPOL dibasic acids.

If it is necessary to plasticise the coating material, there may be used for this purpose a hydrocarbon mineral oil, for example a paraffin lubricating oil.

To provide the coating material with adequate resistance to mechanical degradation upon transportation of the coated bar or ingot, there is advantageously further incorporated into the coating material a toughening agent such as a synthetic thermoplastic material, for example a homopolymer or copolymer of acrylic acid.

In formulating the coating material employed in the present invention, the constituents thereof can be present in the following amounts based on the total weight of the coating material:

|  | % by weight |
| --- | --- |
| Ester I | 50–90 |
| Ester II | 5–25 |
| Wetting Agent | 0–25 |
| Toughening agent | 0–10 |

If desired, the coating material may also contain a colouring material, i.e. a dyestuff or pigment, for cosmetic or identification purposes.

The coating material may be used to coat in accordance with the invention a soft solder alloy either in the form of an extruded bar, which may be of generally trapezoidal cross-section, or in the form of a cast ingot. In either case, the coating material may be applied by immersing the bar or ingot in a bath containing molten coating material, withdrawing the resulting coated bar or ingot from the tank and allowing excess coating material to drip off until the required anti-oxidant coating has formed on the bar or ingot. After the coating has solidified, the coated solder bar or ingot may be packed in layers in a box with suitable interleaving paper or plastics sheeting to prevent any tendency for the coated solder to stick together at high ambient temperatures.

The following Examples illustrate the invention.

EXAMPLE 1

A soft solder alloy consisting of a 60/40 tin/lead alloy was extruded to form a solder bar of trapezoidal cross-section with was cropped so as to provide bars each weighing about 1 kg. and measuring about 430 mm × 25 mm × 12.7 mm. Each bar was then immersed in a molten bath of coating material consisting of the following constituents:

|  | % by weight |
| --- | --- |
| Pentaerythritol tetrabenzoate | 75 |
| Pentaerythritol ester of maleic modified rosin | 15 |
| Empol 1018 | 10 |

Empol 1018 is a commercially available $C_{36}$ essentially aliphatic dicarboxylic acid manufactured by Unilever-Emery N.V. having an acid value of 190–198 mg KOH/g.

The coated bars were then withdrawn from the bath and allowed to dry at ambient temperature, excess coating material being allowed to drip off the coated bars.

The coated bars obtained in this manner were subsequently fed into a static solder bath into which printed circuit assemblies were subsequently dipped for soldering.

EXAMPLE 2

A soft solder alloy consisting of a 63/37 tin/lead alloy was cast into moulds such as to obtain cast ingots weighing about ½ kg. and measuring about 216 mm × 25 mm × 12.7 mm. Each ingot was then coated with the coating material described in Example 1 in a similar manner to that described in Example 1.

The coated ingots were then used to form a static solder bath for the soldering of printed circuit assemblies.

EXAMPLE 3

A soft solder alloy consisting of a 60/40 tin/lead alloy was extruded to form a solder bar which was cropped to provide bars each weighing about 1 kg. Each bar was then immersed in a molten bath of coating material consisting of the following constituents:

|  | % by weight |
| --- | --- |
| Pentaerythritol tetrabenzoate | 79 |
| Pentaerythritol ester of a super-hydrogenated rosin (Foral 105-Hercules Powder Company Limited) | 10 |
| Glycerol ester of hydrogenated rosin (Staybelite Ester 10-Hercules Powder Company Limited) | 10 |
| Dimerised linoleic acid (Empol 1018) | 1 |

The coating was applied to each bar to a thickness of approximately 1 mm. The coated bars possessed good storage stability and were unaffected by prolonged storage at ambient temperature under high humidity conditions.

Coated bars obtained in the foregoing manner were fed into a static solder bath, so that the melted coating formed a surface layer on the molten solder bath which had a temperature of about 250° C. The surface layer of coating material removed the dross at a surface of the molten solder bath and maintained the solder surface bright and ready for soldering over a period of a working day.

Further coated bars were employed in preparing a moving solder bath in a wave soldering machine. The formation of dross on the surface of the molten bath was considerably reduced compared with the amount formed with uncoated bars.

EXAMPLE 4

A soft solder alloy consisting of a 60/40 tin/lead alloy was extruded to form a solder bar which was cropped to provide bars each weighing about 1 kg. Each bar was then immersed in a molten bath of coating material consisting of the following constituents:

|  | % by weight |
| --- | --- |
| Pentaerythritol tetrabenzoate | 70 |
| Pentaerythritol ester of maleic modified rosin | 15 |
| Empol 1010 | 10 |
| Plexidon M 527 | 4 |
| Phthalocyanine blue | 1 |

Empol 1010 is a $C_{36}$ essentially aliphatic dicarboxylic acid having an acid value of 191–197 mg KOH/g and Plexidon M 527 is a commercially available acrylic resin manufactured by Röhm GmbH of Darmstadt, Germany.

The coating was applied to each bar to a thickness of about 1 mm.

Coated bars obtained in the foregoing manner possessed good storage stability and were able to withstand packaging and transportation without damage being caused to the coating.

EXAMPLE 5

Uncoated solder bars were produced as described in Example 4 and were then coated by immersion in a molten bath of coating material consisting of the following constituents:

|  | % by weight |
| --- | --- |
| Pentaerythritol tetrabenzoate | 74.9 |
| Pentaerythritol ester of maleic modified rosin | 15.0 |
| Empol 1010 | 10.0 |
| Phthalocyanine blue | 0.1 |

Coated solder bars produced in the foregoing manner were fed into a molten solder bath so that the resulting melted coating material formed a surface layer on the molten solder bath, which layer served both as an anti-oxidant covering layer for the solder bath and as a flux for soldering operations involving the use of the solder bath.

We claim:

1. A soft solder alloy in the form of an extruded or cast bar or ingot substantially completely coated with a coating material essentially comprising:
- (I) at least one neutral ester selected from the group consisting of an ester derived from a polyhydric alcohol and at least one saturated fatty acid, an ester derived from a polyhydric alcohol and at least one unsaturated fatty acid and an ester derived from a polyhydric alcohol and a monocarboxylic aromatic acid, said ester having a molecular weight of at least 300, and
- (II) at least one ester selected from the group consisting of an ester derived from a polyhydric alcohol and a rosin and an ester derived from a polyhydric alcohol and a modified rosin.

2. A soft solder alloy in the form of an extruded or cast bar or ingot substantially completely coated with a coating material essentially comprising:
- (a) from 50 to 90 weight percent of (I) at least one neutral ester selected from the group consisting of an ester derived from a polyhydric alcohol and at least one saturated fatty acid, an ester derived from a polyhydric alcohol and at least one unsaturated fatty acid and an ester derived from a polyhydric alcohol and a monocarboxylic aromatic acid, said ester having a molecular weight of at least 300;
- (b) from 5 to 25 weight percent of (II) at least one ester selected from the group consisting of an ester derived from a polyhydric alcohol and a rosin and an ester derived from a polyhydric alcohol and a modified rosin;
- (c) from 0 to 25 weight percent of a wetting agent selected from aliphatic and aromatic mono- and polycarboxylic acids; and
- (d) from 0 to 10 weight percent of a toughening agent selected from synthetic thermoplastic materials.

3. The coated solder bar or ingot of claim 2, wherein the ester (I) has a molecular weight in the range from 300 to 3000; the ester (II) is selected from the group consisting of an ester derived from an hydrogenated rosin and an ester derived from a maleic-modified rosin; and the toughening agent is selected from the group consisting of a homopolymer of acrylic acid and a copolymer of acrylic acid.

4. A coated solder bar or ingot as claimed in claim 3, wherein the ester (I) is derived from a polyhydric alcohol containing from 2 to 8 hydroxyl groups.

5. A coated solder bar or ingot as claimed in claim 4, wherein the ester (I) is pentaerythritol tetrabenzoate.

6. A coated solder bar or ingot as claimed in claim 3, wherein the ester (II) is derived from pentaerythritol or glycerol.

7. A coated solder bar or ingot as claimed in claim 5, wherein the ester (II) is the pentaerythritol ester of a maleic modified rosin.

8. A method of forming a solder bath for use in the production of electronics equipment, which comprises converting into a molten condition at least one coated soft solder bar or ingot as claimed in claim 1 to form a solder bath the surface of which is substantially free from dross.

9. A method for forming a solder bath for use in the production of electronics equipment, which comprises converting into a molten condition at least one coated soft solder bar or ingot as claimed in claim 2, the coating material containing said wetting agent, to form a solder bath the surface of which is substantially free from dross and which bath does not require the separate use of a soldering flux in a soft soldering operation in which the bath is employed.

* * * * *